3,352,889
STEROIDAL 6-CHLORO-4,6-DIENES
Yvon Lefebvre, Pierrefonds, Quebec, Canada, assignor to American Home Products Corporation, New York, N.Y., a corporation of Delaware
No Drawing. Filed Aug. 1, 1963, Ser. No. 299,158
Claims priority, application Canada, Oct. 27, 1962, 861,132
14 Claims. (Cl. 260—397.2)

The present invention relates to steroidal 6-chloro-4,6-dienes of the pregnane, androstane, and cholestane series, which are characterized by possessing the following structure in rings A and B

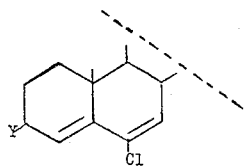

in which Y represents an acyloxy, an hydroxyl, or a keto group, and to methods for their preparation. More specifically, the present invention relates to 6-chloropregna-4,6-dien-20-one, and to methods for the preparation of compounds of the general Formulae II and III:

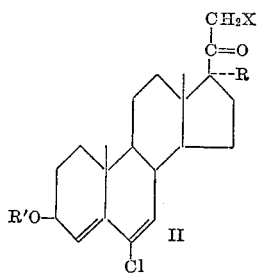 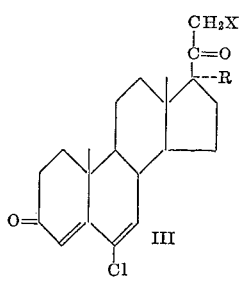

in which R represents hydrogen, acyloxy, or a straight chain lower alkyl group containing from 1–4 carbon atoms, R' represents hydrogen or an acyl group, and X represents hydrogen or fluorine.

The new compounds produced in accordance with my invention are useful compounds, in that they are useful in steroid research generally and as intermediates in the preparation of other steroid compounds which are characterized by biological activities. For example, the compounds of this invention in the pregnane series are useful as progestational agents of unusually high potency, active both by injection and by oral administration. The compounds of this invention in the pregnane series are further distinguished by being useful for maintaining pregnancy. Said compounds have also been found to be substantially free from objectionable side-effects such as masculinization and suppression of adrenal function, and other compounds of this invention in the pregnane series have been found to possess valuable anti-androgenic activity. Of the other compounds of this invention, 6-chloro-3β,17β-diacetoxy-androsta-4,6-diene has valuable androgenic, anabolic, and gonadotrophin-suppressing properties, and 6-chloro-3β-hydroxycholesta-4,6-diene is useful as a cholesterol-lowering agent.

The compounds of this invention may be administered in dosage forms such as tablets, capsules, or the like, such dosage forms to contain from 1 to 50 mg. of active compound per dosage form, the active agent being present in such dosage forms together with excipients such as, lactose, starch, magnesium stearate, and the like, as well as such other substances as are commonly used in the formulation of dosage forms for oral administration. For the purposes of administering the compounds of this invention by injection they may be suspended in a fine state of division in a pharmaceutically acceptable aqueous vehicle, or they may be administered in solution in a pharmaceutically acceptable solvent.

The compounds of this invention corresponding to Formula II in which R', R, and X are as defined above, are also useful as intermediates in the preparation of the compounds of Formula III, in which R and X are as defined above.

The starting materials for the preparation of the compounds of this invention are 3β-acyloxy-Δ⁴-6-ketosteroids of the pregnane, androstane, and cholestane series possessing the following structure in rings A and B

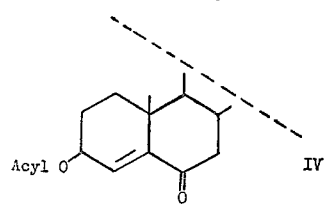

More specifically those starting materials are new 4-pregnene-6,20-diones which may be represented by the general Formula V

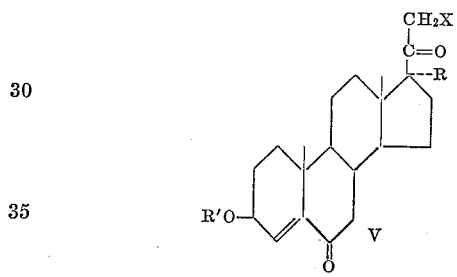

in which R represents hydrogen, a straight chain lower alkyl group containing from 1–4 carbon atoms, or an acyloxy group, X represents hydrogen or fluorine, and R' represents an acyl group.

Those compounds may be prepared as described in the copending patent application of Yvon Lefebvre and Peter F. Morand, Ser. No. 428,252, filed Jan. 26, 1965, said patent application being a continuation-in-part of their previous application, Ser. No. 285,210, filed June 4, 1963 (now abandoned).

I have now found that treatment of a 3β-acyloxy-Δ⁴-6-ketosteroid of Formula IV, or of a 4-pregnene-6,20-dione of a structure corresponding to Formula V with phosphorus pentachloride in an inert solvent yields a compound of the structure represented by Formula I in which Y represents an acyloxy group, or, respectively, of Formula II in which R' represents an acyl group and R and X have the significance defined above. The inert solvent must not contain groupings which will react with phosphorus pentachloride and it must not be basic nor a Lewis base. Preferred solvents are aromatic hydrocarbons, for example, benzene, lower aliphatic esters, for example, methyl or ethyl acetate, and certain halogenated aliphatic hydrocarbons such as, for example, carbon tetrachloride. The course of this reaction is entirely unexpected in that the 20-keto group of the starting material is not affected, contrary to the well-known reaction of phosphorus pentachloride with aliphatic ketones. Temperature of the reaction is not critical, although extreme temperature will decrease the yield of desired end product. Operable temperatures include temperatures between 20° C. and the temperature of the boiling reaction mixture, with a temperature range of between 20° and 30° C. being preferred. Similarly, the molar ratio of phosphorus pentachloride to 6-keto steroid is not critical but affects the speed of reaction. For example, this molar ratio may be varied from 1:1 to 5:1 with ensuing speeding up of the reaction; with a 1:1 molar ratio of reactants the reaction is essentially complete in from one to two hours; with a 2:1 molar ratio, in approximately one-half hour; and with a 5:1 molar ratio, in approximately five minutes.

I have found, in a preferred embodiment of this invention, that it is advantageous to add a base which is soluble in the reaction mixture such as, for example, pyridine, or a Lewis base which is also soluble in the reaction mixture such as, for example, dioxane, to the reaction mixture a short time after the spontaneous start of the reaction in amounts inferior to those necessary to stop the reaction. In one particular embodiment of my invention addition of one molar equivalent of such a base or Lewis base has been found to improve yields by a factor of at least three.

After completion of the reaction the desired end product is recovered from the reaction mixture by conventional means. In a preferred reaction procedure an organic base soluble in the solvent employed, such as, for example, pyridine, is added at the end of the reaction in amounts sufficient to stop the reaction. Amounts of two to three moles per mole of $PCl_5$ have been found sufficient for this purpose. The precipitate thus obtained is removed by filtration. The filtrate contains the desired steroidal 6-chloro-4,6-diene of Formula I in which Y represents an acyloxy group, or, respectively, the 6-chloro-pregna-4,6-dien-20-one of Formula II in which R' represents an acyl grouping, and R and X are as defined above. The latter compound is isolated by evaporation of the solvent and purified by conventional procedures such as, for example, chromatography and or crystallization.

The 3-acylates of the steroidal 6-chloro-4,6-dienes or 6-chloropregna-4,6-dien-20-ones obtained above are hydrolyzed in a basic medium to yield the corresponding steroidal 6-chloro-4,6-dienes of Formula I in which Y represents an hydroxyl group, or, respectively, the 6-chloro-3β-hydroxy-pregna-4,6-dien-20-ones of Formula II in which R' represents hydrogen and R and X have the significance defined above. The latter compounds are oxidized by conventional means such as, for example, the Oppenauer method or by hexavalent chromium ion, to the corresponding steroidal 6-chloro-4,6-dienes of Formula I in which Y represents a keto group, or, respectively, the 6-chloro-6-dehydroprogesterones of Formula III in which R and X have the significance defined above. The latter compounds may again be reduced to the corresponding 3β-alcohols of Formulas I or II in which Y represents an hydroxyl group, or in which R' represents hydrogen, respectively, by reaction with a reducing agent, such as, for example, sodium borohydride or lithium tri-(tertiary butoxy) aluminum hydride.

More specifically, 3β-acetoxypregna-4-ene-6,20-dione (III, R'=$CH_3CO$, R=X=H) yields 3β-acetoxy-6-chloropregna-4,6-dien-20-one (I, R'=$CH_3CO$, R=X=H), which may be hydrolyzed to the corresponding alcohol, 6-chloro-3β-hydroxy-pregna-4,6-dien-20-one (I, R'=R=X=H), which may in turn be oxidized to the corresponding 3-ketone, 6-chloro-6-dehydroprogesterone (II, R''X=H).

In the same manner 3β-acetoxy-17α-methylprgn-4-ene-6,20-dione (III, R'=$CR_3CO$, R=$CH_3$, X=H) yields 3β-acetoxy-6-chloro-17α-methylpregna-4,6-dien-20-one (I, R'=$CH_3CO$, R=$CH_3$, X=H). The latter compound is hydrolyzed to the corresponding alcohol, 6-chloro-3β-hydroxy-17α-methylpregna-4,6-dien-20-one (I, R=$CH_3$, R'=X=H), which is oxidized to the corresponding 6-chloro-6-dehydro-17α-methylprogesterone (II, R=$CH_3$, X=H). In a similar manner other corresponding 17α-lower alkyl compounds, such as the 3β-acetoxy-6-chloro-17α-ethylpregna-4,6-dien-20-one, 3β-acetoxy-6-chloro-17α-n-propyl-pregna-4,6-dien-20-one, 3β-acetoxy-17α-n-butyl-4-chloropregna-4,6-dien-20-one, and their corresponding products of hydrolysis and oxidation may be obtained.

In a similar manner 3β-acetoxy-21-fluoro-17α-methylpregna-4-ene-6,20-dione (III, R'=$CH_3CO$, R=$CH_3$, X=F), yields 3β-acetoxy-6-chloro-21-fluoro-17α-methylpregna-4-ene-6,20-dione (III, R'=$CH_3CO$, R=$CH_3$, pregna-4-ene-6,20-dione (III, R'=$CH_3CO$, R=$CH_3$, The latter compound may be hydrolyzed to the corresponding alcohol, 6-chloro-21-fluoro-3β-hydroxy-17α-methylpregna-4,6-dien-20-one (I, R'=H, R=$CH_3$, X=F), which may be oxidized to 6-chloro-6-dehydro-21-fluoro-17α-methylprogesterone (II, X=F, R=$CH_3$). The same sequence of reactions may also be carried out with the other corresponding 17α-lower alkyl-21-fluoro compounds such as the 17α-ethyl, 17α-n-propyl and 17α-n-butyl compounds to yield the corresponding 3β-acetoxy-6-chloro-21-fluoro-17α-(lower alkyl)-pregna-4,6-dien-20-ones, and their corresponding products of hydrolysis and oxidation; in the same manner, the corresponding 3β-acetoxy-21-fluoro-pregna-4-ene-6,20-dione yields 3β-acetoxy-6-chloro-21-fluoro-pregna-4,6-dien-20-one and its products of hydrolysis and oxidation.

Similarly, 3β,17α-diacetoxypregn-4-ene-6,20-dione (III, R=$CH_3CO$, R'=$CH_3COO$, X=H) yields 6-chloro-3β,17α-diacetoxy-pregna-4,6-dien-20-one (I, R'=$CH_3CO$, R=$CH_3COO$, X=H). The latter compound is hydrolyzed to 17α-acetoxy-6-chloro-3β-hydroxy-pregna-4,6-dien-20-one (I, R'=X=H, R=$CH_3COO$), which is oxidized to 17α-acetoxy-6-chloro-6-dehydroprogesterone (II, R=$CH_3COO$, X=H). The latter compound is reduced to its precursor (I, R'=X=H, R=$CH_3COO$). Similarly, the corresponding compounds in which the 21-position is substituted with fluorine may be prepared, as well as the corresponding compounds in which the 17α-hydroxy group is esterified with lower aliphatic acids such as, for example, the 17α-hydroxy hexanoate. Examples of compounds which are obtained in the above manner include 6-chloro-3β,17α-diacetoxy-21-fluoropregna-4,6-dien-20-one and its products of hydrolysis and oxidation, 3β-acetoxy-6-chloro-21-fluoro-17α-hexanoyloxypregna-4,6-dien-20-one and its products of hydrolysis and oxidation, and 3β-acetoxy-6-chloro-17α-hexanoyloxy-pregna-4,6-dien-20-one and its products of hydrolysis and oxidation.

In a similar manner, 3β,17β-diacetoxyandrost-4-en-6-one, prepared from the known 3β,17β-diacetoxy-5α-hydroxyandrostan-6-one by treatment with thionyl chloride, yields 6-chloro-3β,17β-diacetoxyandrost-4,6-diene when treated with phosphorus pentachloride. In the same manner, the known 3β-acetoxycholest-4-en-6-one yields, upon treatment withm phosphorus pentachloride, 3β-acetoxy-6-chloro-cholesta-4,6-diene, from which the corresponding 3β-hydroxy compound, 6-chloro-3β-hydroxycholesta-4,6-diene, is obtained by mild alkaline hydrolysis.

The following examples will illustrate my invention:

*Example 1.—3β-acetoxy-6-chloropregna-4,6-dien-20-one*

A mixture of 3β-acetoxypregn-4-en-6,20-dione (10.8 g.) phosphorus pentachloride (10.8 g.) and benzene (518 cc.) is stirred at room temperature for one minute. Then dioxane (4.4 cc.) and benzene (52 cc.) are added and the stirring is resumed for thirty minutes at room temperature. At the end of this time pyridine (12 cc.) is added. Pyridine hydrochloride is filtered, well washed with ether, and the filtrate is washed with sodium bicarbonate, water, dried, and evaporated, leaving crude 3β-acetoxy-6-chloropregna-4,6-dien-20-one. Purification by chromatography on florisil gives the pure chloro derivative, which shows in the ultra-violet spectrum maxima of absorption, characteristic of the system, at 238 mμ, 243 mμ, and 251 mμ.

Hydrolysis of the above compound in a manner similar to that described in Example 3 of this application yields the corresponding alcohol, 6-chloro-3β-hydroxypregna-4,6-dien-20-one.

*Example 2.—3β-acetoxy-6-chloro-17α-methylpregna-4,6-dien-20-one*

A mixture of 2.375 g. of 3β-acetoxy-17α-methylpregn-4-ene-6,20-dione, 2.375 g. of phosphorus pentachloride in 110 cc. of dry benzene, is stirred for 30 minutes at room temperature. The solution is poured in ice-water and the benzene solution is washed with sodium bicarbonate and water, is dried and evaporated to dryness. Chromatography and crystallization from methanol gives the pure 3β - acetoxy - 6-chloro-17α-methylpregna-4,6-dien-20-one M.P. 139–141° C. $[\alpha]_D = -67°$.

Calculated for $C_{24}O_3H_{33}Cl$: C, 71.18%; H, 8.21%; Cl, 8.75%. Found: C, 70.94%; H, 8.28%; Cl, 8.70%.

Alternatively, a mixture of 1 g. of 3β-acetoxy-17α-methylpregn-4-en-6,20-dione, 1 g. of phosphorus pentachloride in 50 cc. of dry benzene is stirred at room temperature for one minute. A solution of 0.4 cc. of dry dioxane in 5 cc. benzene is then added and the reaction is allowed to proceed for thirty minutes.

The reaction mixture is poured in an ice-cold sodium bicarbonate solution. The organic layer is decanted, washed free of base, dried and evaporated. The residue is a yellow resin, which upon chromatography on Florisil and crystallization from methanol yields 3β-acetoxy-6-chloro-17α-methylpregna-4,6 - dien - 20 - one, M.P. 136–141° C.

Similarly, a mixture of 1 g. of 3β-acetoxy-17α-methylpregn-4-en-6,20-dione, 1 g. of phosphorus pentachloride and 50 cc. of benzene is stirred for a minute. Then at regular intervals (three minutes) are introduced small portions of a solution of 0.35 cc. of pyridine in 5 cc. of benzene. After thirty minutes the remainder of the pyridine solution is added.

The reaction is worked up as described above to yield 3β - acetoxy - 6-chloro-17α-methylpregna-4,6-dien-20-one, M.P. 136–139° C.

Similarly, a mixture of 200 mg. of 3β-acetoxy-17α-methylpregn-4-ene-6,20-dione, 200 mg. of phosphorus pentachloride, and 10 cc. of carbon tetrachloride is stirred at room temperature for 30 minutes, and 0.1 cc. of pyridine is added at the end of the reaction. Working up as described above and crystallization from methanol yields 3β - acetoxy - 6-chloro-17α-methylpregna-4,6-dien-20-one, M.P. 138–143° C.

In the same manner, a mixture of 200 mg. of 3β-acetoxy,17α-methylpregn-4-ene-6,20-dione, 200 mg. of phosphorus pentachloride and 10 cc. ethyl acetate is stirred at room temperature for 30 minutes, and 0.1 cc. of pyridine is added at the end of the reaction. Working up as described above yields 3β-acetoxy-6-chloro-17α-methyl-pregna-4,6-dien-20-one identified with an authentic sample by thin-layer chromatography.

*Example 3.—6-chloro-3β-hydroxy-17α-methyl-pregna-4,6-dien-20-one*

A solution of 3β-acetoxy-6-chloro-17α-methylpregna-4,6-dien-20-one (5.3 g.), potassium bicarbonate (1.37 g.), methanol (215 cc.) and water (21.5 cc.) is refluxed under nitrogen for 30 minutes.

To the still hot solution water is added and the resulting solid is filtered and dried M.P. 187.5–188.5° C. Further crystallization from methylene chloride-hexane does not raise the melting point of 6-chloro-3β-hydroxy-17α-methylpregna-4,6-dien-20-one. The ultra-violet spectrum shows maxima of absorption at 237 mμ, 244 mμ ($\epsilon = 22590$), 252 and 287 mμ ($\epsilon = 67.4$).

*Example 4.—6-chloro-6-dehydro-17α-methylprogesterone*

To a solution of 6-chloro-3β-hydroxy-17α-methyl-pregna-4,6-dien-20-one (500 mg.) in acetone (60 cc.) at 0° C., is added a solution of 8 N chromic acid (1 cc.). The mixture is immediately poured on ice-$H_2O$ and ether extracted. The ether is washed free of acid, dried and evaporated, leaving an amorphous residue. Purification by chromatography and crystallization from hexane gives the pure 6-chloro-6-dehydro-17α-methylprogesterone, M.P. 122–124° C. The infra-red spectrum is identical with that of authentic 6-chloro-6-dehydro-17α-methylprogesterone.

*Example 5.—3β-acetoxy-6-chloro-21-fluoro-17α-methylpregna-4,6-dien-20-one*

A mixture of 3β-acetoxy-21-fluoro-17α-methylpregn-4-en-6,20-dione (4.15 g.), phosphorus pentachloride (4.15 g.) in benzene (200 cc.) is stirred for one minute at room temperature. A solution of dioxane (1.6 cc.) in pyridine (20 cc.) is then added and stirring is continued for thirty minutes. Pyridine (2.8 cc.) is added and the pyridine hydrochloride is filtered. The filtrate is washed with sodium bicarbonate and water, dried and evaporated, leaving a yellow resin. Crystallization from methanol and from methylene chloride-hexane gives pure 3β-acetoxy-6-chloro-21-fluoro-17α-methylpregna-4,6-dien-20-one, M.P. 172–173° C. λ max. 236 mμ, 243 mμ ($\epsilon = 25,800$), 250 mμ, 290 mμ ($\epsilon = 77$).

Calculated for $C_{24}H_{32}O_3ClF$: C, 68.14%; H, 7.68%; Cl, 8.39%; F, 4.49. Found: C, 67.90%; H, 7.71%; Cl, 8.17%; F, 4.44.

Hydrolysis of the above compound in a manner similar to that described in Example 3 of this application yields the corresponding alcohol, 6-chloro-21-fluoro-3β-hydroxy-17α-methylpregna-4,6-dien-20-one.

*Example 6.—3β,17α-diacetoxy-6-chloropregna-4,6-dien-20-one*

A mixture of 3β,17α-diacetoxypregn-4-en-6,20-dione (3 g.) phosphorus pentachloride (3 g.) and benzene (150 cc.) is stirred at room temperature for one minute. Then dry dioxane (1.2 cc.) dissolved in benzene (15 cc.) is added and the reaction is continued for thirty minutes. At the end of this time pyridine (2.2 cc.) is added. The pyridine hydrochloride thus formed is filtered and washed with ether. The filtrate is washed with cold sodium bicarbonate, water, dried and evaporated. The residue is a resin which, crystallized from methanol, and then methylene chloride-hexane, gives pure 3β,17α-diacetoxy-6-chloropregna-4,6-dien-20-one, M.P. 202.5–204° C. (dec.) $[\alpha]_D = -895°$ C. $\lambda_{max}$. 236 mμ ($\epsilon = 22,200$), 231 mμ, 283 mμ ($\epsilon = 105$).

Calculated for $C_{25}H_{33}O_5Cl$: C, 66.87%; H, 7.41%; Cl, 7.91%. Found: C, 66.79%; H, 7.42%; Cl, 8.07%, 8.06%.

*Example 7.—17α-acetoxy-6-chloro-3β-hydroxypregna-4,6-dien-20-one*

A mixture of 3β,17α-diacetoxy-6-chloropregna-4,6-dien-20-one (50 mg.), potassium bicarbonate (13 mg.), methanol (2 cc.) and water (0.2 cc.) is refluxed for thirty minutes. Addition of water gives a colourless solid M.P. 210–211° C. (dec.). Crystallization from acetone-hexane does not raise the melting point. 17α-acetoxy-6-chloro-3β-hydroxypregna-4,6-dien-20-one shows in the ultra-violet maxima of absorption of 236 mμ, 243 mμ ($\epsilon = 23,400$), 252 mμ and 287 mμ ($\epsilon = 142$).

A mixture of 17α-acetoxy-6-chloro-6-dehydroprogesterone (50 mg.), dry tetrahydrofuran (1 cc.), lithium aluminum tri-tertiary butoxy hydride (76.2 mg.), is stirred at room temperature for four hours. The excess of hydride is destroyed by acetone and a saturated solution of ammonium sulfate is added. The mixture is extracted with $CH_2Cl_2$, washed with saturated sodium chloride, dried and evaporated. Crystallization of the residue from acetone-hexane gives 17α - acetoxy - 3β - hydroxy - 6 - chloropregna-4,6-dien-20-one, M.P. 213° C. (dec.) identical with the product obtained above, as shown by infra-red spectroscopy.

*Example 8.—17α-acetoxy-6-chloro-6-dehydroprogestrone*

To a solution of 17α-acetoxy-3β-hydroxy-6-chloropregna-4,6-dien-20-one (50 mg.) in acetone (5 cc.) at 0° C. is added dropwise with stirring a solution of 8 N chromic acid (0.15 cc.) and then the mixture is immediately poured in ice-water and extracted with methylene chloride. The organic solution is washed free of acid, dried and evaporated. The residue is 17α-acetoxy-6- chloro-6-dehydroprogesterone. The infra-red and the ultra-violet spectra are identical with that of an authentic sample of 17α-acetoxy-6-chloro-6-dehydroprogesterone.

Alternatively, a mixture of 17α-acetoxy-6-chloro-3β-hydroxypregna-4,6-dien-20-one (275 mg.) aluminum isopropoxide (300 mg.), acetone (1.2 cc.) and benzene (15 cc.) is stirred for twenty-four hours at room temperature. The benzene solution is diluted with ether and the organic solution is washed with cold dilute sulfuric acid, then water. After drying and evaporation, the residue is a resin. Spectral analyses in the infra-red and ultra-violet indicate that this crude compound contains about 30% of 17α-acetoxy-6-chloro-6-dehydroprogesterone.

*Example 9.—3β,17β-diacetoxyandrost-4-en-6-one*

To a solution of 3β,17β-diacetoxy-5A-hydroxyandrostan-6-one [Leo Knoff, Ann. 647, 53 (1961)] (6.6 g.) in dry pyridine (66 cc.) at 0° C., is added dropwise at such a rate as to maintain the temperature at 0° C., a solution of thionyl chloride (6.6 cc.) in dry pyridine (15 cc.).

The solution is stirred for one hour at 0° C.; then it is poured in ice-water and the resulting solid is filtered and washed with water. The solid is dissolved in methylene chloride and the organic solution is washed with dilute sulfuric acid and then with water to neutrality.

After drying and evaporating the solvent a solid M.P. 165–169° C., representing crude 3β,17β-diacetoxyandrost-4-en-6-one is obtained. Crystallization from methanol yields the pure compound M.P. 172–174° C., $[\alpha]_D = 68.9°$. The ultra-violet spectrum shows a maxima of absorption at 236 mμ with an extinction coefficient of 6930.

Calcd. for $C_{23}H_{32}O_5$: C, 71.10%; H, 8.30%. Found: C, 70.89%; H, 8.22%.

*Example 10.—6-chloro-3β,17β-diacetoxyandrost-4,6-diene*

A mixture of 3β,17β-diacetoxyandrost-4-en-6-one (3.93 g.), phosphorus pentachloride (3.93 g.) and carbon tetrachloride (294 cc.) is stirred at room temperature for 30 minutes; then pyridine (19.6 cc.) is added and the solution is poured on ice-water. This mixture is extracted with ether and the ethereal solution is washed successively with water, sodium bicarbonate and water.

After drying the solvents and evaporating to dryness, the residue is taken in methanol and the resulting solid is filtered, yielding 6-chloro-3β,17β-diacetoxyandrosta-4,6-diene M.P. 159–161° C. Further crystallization from methanol yields the pure chloro derivative M.P. 160–161° C. $[\alpha]_D -73.7°$. The ultra-violet spectrum shows maxima of absorption at 233.5 mμ, 243 mμ, and 251 mμ with extinction coefficients of 20400, 22900 and 15500.

Calcd. for $C_{23}H_{31}O_4Cl$: C, 67.87%; H, 7.68%; Cl, 8.72%. Found: C, 68.01%; H, 7.68%; Cl, 8.86%.

*Example 11.—3β-acetoxy-6-chlorocholesta-4,6-diene*

A mixture of 3β-acetoxycholest-4-en-6-one [M. Heilborn, C. R. N. Jones, F. J. Spring, J. Chem. Soc. (1937) 801] (1.79 g.), phosphorus pentachloride (1.79 g.) and carbon tetrachloride (90 cc.) is stirred at room temperature for 90 minutes. At the end of that time, pyridine (9 cc.) is added and the solution is poured in ice-water. This mixture is extracted with ether and the organic solvents are washed with sodium bicarbonate and water to neutrality.

After drying and evaporating the solvents, the gummy residue is chromatographed on alumina. The pure 3β tures of benzene and hexane. The ultraviolet spectrum acetoxy-6-chlorocholesta-4,6-diene is eluted with mixshows maxima of absorption at 236 mμ, 243 mμ, and 251 mμ with extinction coefficients of 18600, 21200, 14100.

*Example 12.—6-chloro-3β-hydroxycholesta-4,6-diene*

A mixture of 3β-acetoxy-6-chlorocholesta-4,6-diene (1.1 g.), potassium bicarbonate (251 mg.), methanol (45 cc.) and water (4.5 cc.) is refluxed under nitrogen for 30 minutes. To the still hot solution, water is added and the resulting crystalline compound is filtered M.P. 181–185° C.

Further crystallization from methanol gives the pure 6-chloro-3β-hydroxycholesta-4,6-diene M.P. 179–181° C. The ultraviolet spectrum shows maxima absorption at 237 mμ, 244 mμ, and 253 mμ with extinction coefficients of 18200, 21300 and 14200.

I claim:
1. A 6-chloropregna-4,6-diene of the following general structural formula

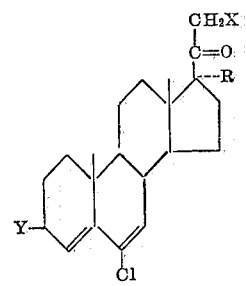

in which X is selected from the group consisting of hydrogen and fluorine; Y is selected from the group consisting of hydroxyl and acetoxy; and R is selected from the group consisting of hydrogen, acetoxy, and straight-chain lower alkyl groups containing from 1 to 4 carbon atoms.

2. 3β-acetoxy-6-chloro-4,6-pregnadien-20-one.
3. 6-chloro-3β-hydroxypregna-4,6-dien-20-one.
4. 3β-acetoxy-6-chloro-17α-methyl-4,6-pregnadien-20-one.
5. 6-chloro-3β-hydroxy-17α-methyl-4,6-pregnadien-20-one.
6. 3β-acetoxy-6-chloro-21-fluoro-17α-methyl-4,6-pregnadien-20-one.
7. 6-chloro-21-fluoro-3β-hydroxy-17α-methylpregna-4,6-dien-20-one.
8. 6-chloro-3β,17α-diacetoxy-4,6-pregnadien-20-one.
9. 17α-acetoxy-6-chloro-3β-hydroxy-4,6-pregnadien-20-one.
10. 6-chloro-3β,17β-diacetoxy-androsta-4,6-diene.
11. 3β-acetoxy-6-chlorocholesta-4,6-diene.
12. 6-chloro-3β-hydroxycholesta-4,6-diene.
13. A compound of the formula

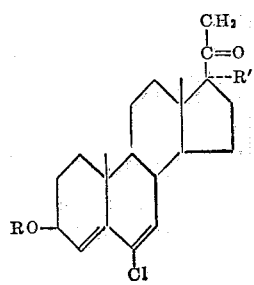

wherein R is selected from the group consisting of hydrogen and lower alkanoyl and R' is lower alkyl.

14. A compound of the formula
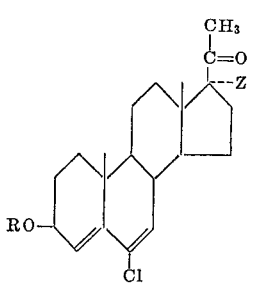
wherein Z is lower alkanoyloxy and R is selected from the group consisting of hydrogen and acetyl.
No references cited.
LEWIS GOTTS, *Primary Examiner.*
ELBERT L. ROBERTS, *Examiner.*
H. FRENCH, *Assistant Examiner.*